United States Patent [19]

Marty, Jr.

[11] 4,176,468

[45] Dec. 4, 1979

[54] COCKPIT DISPLAY SIMULATOR FOR ELECTRONIC COUNTERMEASURE TRAINING

[76] Inventor: William B. Marty, Jr., 535 Margarita Ave., Coronado, Calif. 92118

[21] Appl. No.: 918,013

[22] Filed: Jun. 22, 1978

[51] Int. Cl.² ............................................. G09B 9/00
[52] U.S. Cl. .................................... 35/10.4; 35/12 B
[58] Field of Search ............................. 35/10.4, 12 B

[56] References Cited

U.S. PATENT DOCUMENTS

| | | | |
|---|---|---|---|
| 3,792,475 | 2/1974 | Smetana | 35/10.4 X |
| 3,838,201 | 9/1974 | Appling | 35/10.4 |
| 4,057,913 | 11/1977 | Eisenberg | 35/10.4 X |

Primary Examiner—T. H. Tubbesing
Attorney, Agent, or Firm—Henri J. A. Charmasson

[57] ABSTRACT

In an aircraft for range training of pilots in electronic warfare countermeasures, a device for simulating a threat environment on the cockpit instrumentation. The device comprises an image simulator controlling the threat azimuth indicator, and a control code receiver. The control code is transmitted via the up-link communication system from the air combat manuevering range ground station to the airborne instrumentation subsystems. The control code is recognized by the receiver and applied to the image simulator. The entire device is installed in place of the present threat signal countermeasure receiver and signal processor.

10 Claims, 9 Drawing Figures

| WORD NO ↓ BIT → | No 1 | | | | No 2 | | | | No 3 | | | | No 4 | | | | |
|---|---|---|---|---|---|---|---|---|---|---|---|---|---|---|---|---|---|
| 19 | $2^3$ | $2^2$ | $2^1$ | $2^0$ | $2^3$ | $2^2$ | $2^1$ | $2^0$ | $2^3$ | $2^2$ | $2^1$ | $2^0$ | $2^3$ | $2^2$ | $2^1$ | $2^0$ | THREATS IDENTIFICAT$^N$ |
| | No 5 | | | | No 6 | | | | No 7 | | | | No 8 | | | | |
| 20 | $2^3$ | $2^2$ | $2^1$ | $2^0$ | $2^3$ | $2^2$ | $2^1$ | $2^0$ | $2^3$ | $2^2$ | $2^1$ | $2^0$ | $2^3$ | $2^2$ | $2^1$ | $2^0$ | |
| | NO 1 | | NO 2 | | NO 3 | | NO 4 | | NO 5 | | NO 6 | | NO 7 | | NO 8 | | QUADRANT LOCATION |
| 21 | $2^1$ | $2^0$ | $2^1$ | $2^0$ | $2^1$ | $2^0$ | $2^1$ | $2^0$ | $2^1$ | $2^0$ | $2^1$ | $2^0$ | $2^1$ | $2^0$ | $2^1$ | $2^0$ | |
| | $X_1$ | | | | | | | | $Y_1$ | | | | | | | | |
| 22 | $2^7$ | $2^6$ | $2^5$ | $2^4$ | $2^3$ | $2^2$ | $2^1$ | $2^0$ | $2^7$ | $2^6$ | $2^5$ | $2^4$ | $2^3$ | $2^2$ | $2^1$ | $2^0$ | |
| | $X_2$ | | | | | | | | $Y_2$ | | | | | | | | |
| 23 | $2^7$ | $2^6$ | $2^5$ | $2^4$ | $2^3$ | $2^2$ | $2^1$ | $2^0$ | $2^7$ | $2^6$ | $2^5$ | $2^4$ | $2^3$ | $2^2$ | $2^1$ | $2^0$ | |
| | $X_3$ | | | | | | | | $Y_3$ | | | | | | | | X,Y COORDINATES |
| 24 | $2^7$ | $2^6$ | $2^5$ | $2^4$ | $2^3$ | $2^2$ | $2^1$ | $2^0$ | $2^7$ | $2^6$ | $2^5$ | $2^4$ | $2^3$ | $2^2$ | $2^1$ | $2^0$ | |
| | $X_4$ | | | | | | | | $Y_4$ | | | | | | | | |
| 25 | $2^7$ | $2^6$ | $2^5$ | $2^4$ | $2^3$ | $2^2$ | $2^1$ | $2^0$ | $2^7$ | $2^6$ | $2^5$ | $2^4$ | $2^3$ | $2^2$ | $2^1$ | $2^0$ | |
| | $X_5$ | | | | | | | | $Y_5$ | | | | | | | | |
| 26 | $2^7$ | $2^6$ | $2^5$ | $2^4$ | $2^3$ | $2^2$ | $2^1$ | $2^0$ | $2^7$ | $2^6$ | $2^5$ | $2^4$ | $2^3$ | $2^2$ | $2^1$ | $2^0$ | |
| | $X_6$ | | | | | | | | $Y_6$ | | | | | | | | |
| 27 | $2^7$ | $2^6$ | $2^5$ | $2^4$ | $2^3$ | $2^2$ | $2^1$ | $2^0$ | $2^7$ | $2^6$ | $2^5$ | $2^4$ | $2^3$ | $2^2$ | $2^1$ | $2^0$ | |
| | $X_7$ | | | | | | | | $Y_7$ | | | | | | | | |
| 28 | $2^7$ | $2^6$ | $2^5$ | $2^4$ | $2^3$ | $2^2$ | $2^1$ | $2^0$ | $2^7$ | $2^6$ | $2^5$ | $2^4$ | $2^3$ | $2^2$ | $2^1$ | $2^0$ | |
| | $X_8$ | | | | | | | | $Y_8$ | | | | | | | | |
| 29 | $2^7$ | $2^6$ | $2^5$ | $2^4$ | $2^3$ | $2^2$ | $2^1$ | $2^0$ | $2^7$ | $2^6$ | $2^5$ | $2^4$ | $2^3$ | $2^2$ | $2^1$ | $2^0$ | |

FIG. 5

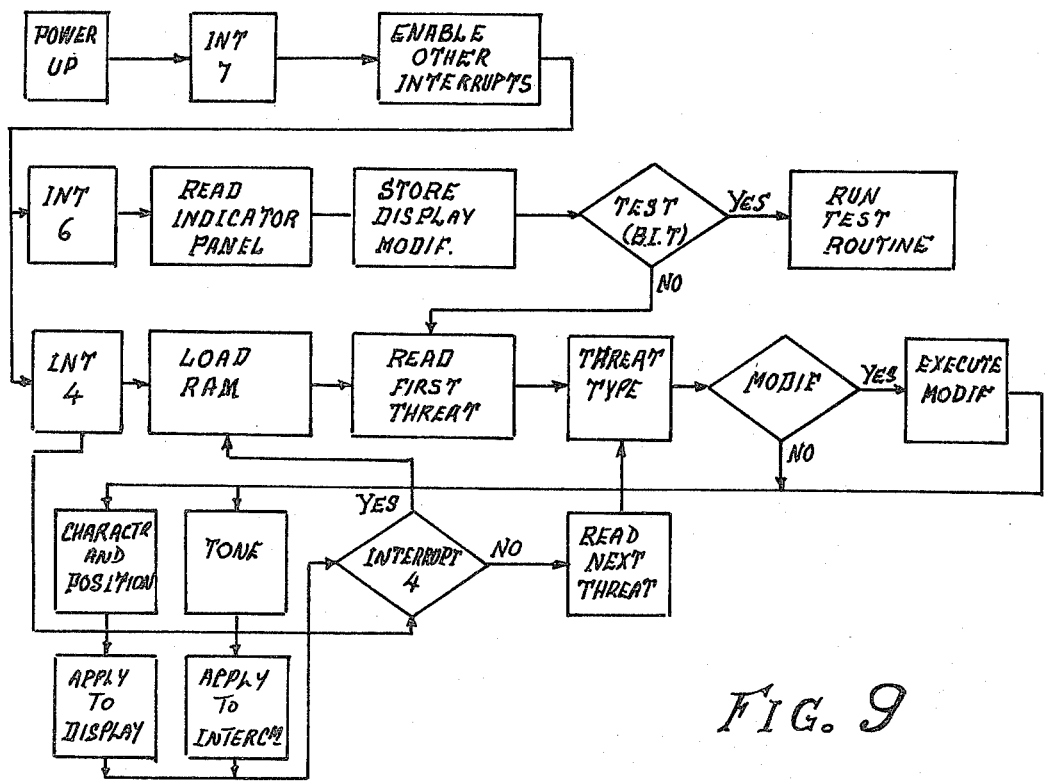

FIG. 9

COCKPIT DISPLAY SIMULATOR FOR ELECTRONIC COUNTERMEASURE TRAINING

BACKGROUND OF THE INVENTION

The present invention relates to the training of military pilots in electronic warfare countermeasures which must be taken by an aircraft threatened by electronically guided threats such as a surface-to-air missile, automatic aircraft artillery, and airborne interceptor. A common characteristic of these weapons is the fact that they are controlled by electromechanical radiation signals emitted by guiding stations and/or by the weapons themselves.

The standard defensive measure consists of detecting and interpreting these guiding signals in order to give warning to the pilot of the aircrafts which come within these weapons range of action. The pilot may then undertake evasive maneuvers to avoid these threats or take electronic countermeasure to deflect or abort these weapons.

The aircraft used in electronic countermeasure operation is normally equipped with radar warning (or threat signal) receiver which is tuned to the enemy's guidance signals and with a signal processor which interprets these signals and controls the display instrumentation of the cockpit. The logic circuitry of the signal processor is based on the knowledge about the enemy's weapon derived through combat experience and intelligence gathering operations.

Pilots are trained through exercises on an air combat maneuvering range. The training of aircrews in the proper use of their radar warning (threat signal) receivers is extremely important to survival in combat environment. In dog-fight training the pilot must be taught to cope with surface-to-air missiles and automatic aircraft artillery threats as well as to attack airborne targets.

At the present time it is not possible to accomplish this training without expensive simulation of combat environment by ground equipment mimicking the enemy guidance activity of their weapons.

A very informative description of this type of electromagnetic threat simulation devices can be read in the May 30, 1977 issue of the magazine AVIATION WEEK & SPACE TECHNOLOGY.

The basic air combat maneuvering range comprises a control ground station, at least one training craft and a plurality of signal emitting stations. The signal emitting stations are programed for mimicking the radar control signals of a surface-to-air missile, automatic aircraft artillery or airborne target. The aircraft detects simulated threat signals, interprets them and cause an azimuth indication of the location of the simulated threats to be displayed on the cockpit instruments.

The pilot reaction to these threats is monitored at the ground control station by means of aircraft position indicator equipment installed in a pod attached to the aircraft. The pod comprises a receiver and a transmitter linked to the ground control station. The ground control station can interrogate the pod via an uplink message. The pod transmits data indicating the position, speed, direction of travel and other parameters to the ground station via a down-link message.

The ground station is thus able to monitor the activity of the aircraft in response to the signal emitted by the mimicking stations.

The operation of an air combat maneuvering range of the type just described has many shortcomings.

Firstly, the large amount of electromagnetic radiations emitted by the mimicking stations often interfere with television and radio communications in the area of the range.

Secondly, those electromagnetic radiations can be easily monitored by hostile powers who can learn from such operations how much is known about their weaponery. They can also learn much about the countermeasures taken by the aircraft pilot. From these observations, they can devise anti-counter measure techniques for their weapons.

Thirdly, the complexity and cost of the equipment required to properly mimic the weapon guidance signals can reach staggering proportions.

Finally, the proper operation of the range requires a complex communication network between the ground control station, the weapon mimicking stations and the aircraft.

SUMMARY OF THE INVENTION

The present invention applied to an Air Combat Maneuvering Range provides for displaying a threat environment on the cockpit instrumentation of a training aircraft by means of a threat simulator installed on the aircraft. The simulator is an electronic display generator mounted in place of the current countermeasure receiver and signal processor package. The simulator is controlled directly from the ground station through a coded information transmitted on the uplink communication sent from the ground control station to the aircraft instrumentation monitor pod.

The main object of the invention is to eliminate the threat mimicking radar stations currently used on an air combat maneuvering range.

A second object of the invention is to limit the number and intensity of electronic signal radiations emitted by current range installations.

Another object of the invention is to preserve secrecy over the intelligence data used in the implementation of an air combat maneuvering range.

An additional object of the invention is to provide a threat simulation apparatus which can be installed in place of the counter measure receiver and signal processor presently used in certain aircrafts.

A further object of the invention is to render the range equipment more readily adaptable to new threat simulations and to simplify its control.

Other useful objects of this invention will become apparent from the following description of its preferred embodiment.

IN THE DRAWING

FIG. 5 is a chart illustrating the format of the threat instruction message.

FIG. 9 is the general flow diagram of the processor.

DESCRIPTION OF THE PREFERRED EMBODIMENT OF THE INVENTION

Figure 1:
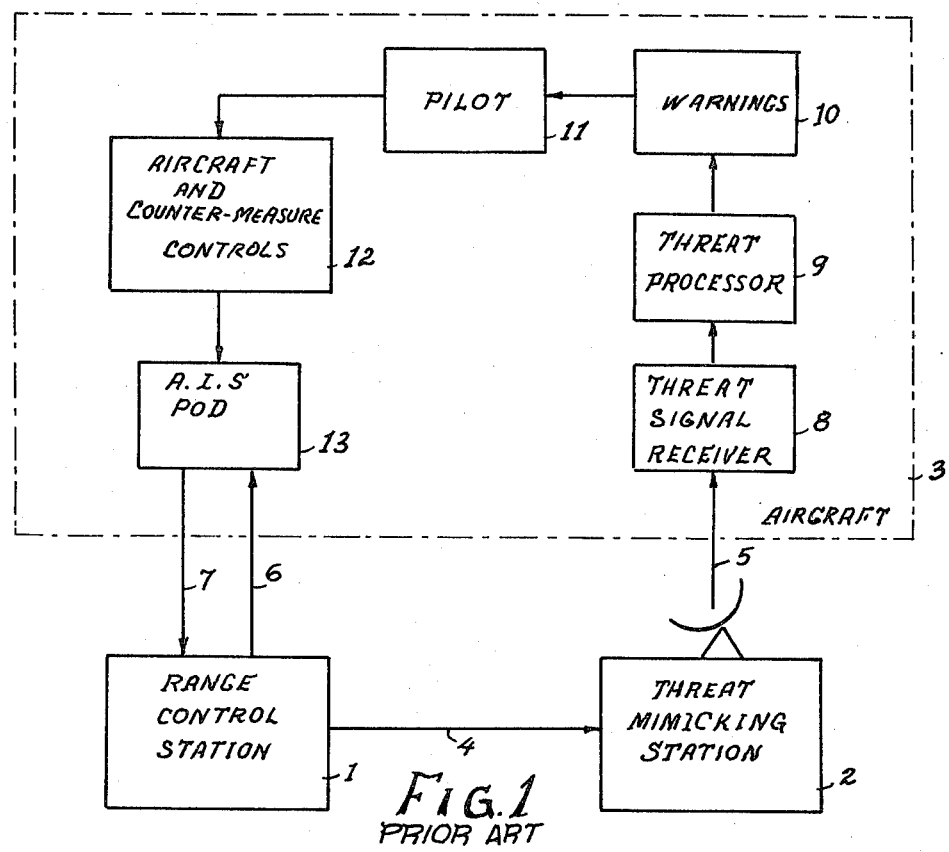
FIG. 1 is a block diagram illustrating the operation of present air combat maneuvering ranges.

Referring to the drawing, there is diagrammatically illustrated in FIG. 1 the basic components of a present air combat maneuvering range (AC.M.R.) used for training and evaluating pilots and techniques in electronic warfare.

The range comprises a ground control station 1, at least one threat mimicking station 2, and at least one training aircraft 3. In response to an instruction 4 from the ground control station, the threat mimicking station 2 simulates a electromagnetic signal 5 similar to those emitted by enemy radars controlling the firing of a surface-to-air missile, automatic aircraft artillery or an airborne interceptor. These signals 5 are sensed by the aircraft threat signal receiver 8. The threat signals are analyzed by a processor 9 which generate visual and/or audio warnings 10 in the cockpit of the aircraft 3. The pilot 11 is trained to react to these warnings 10 by taking the necessary countermeasures to avoid, deflect or abort the detected threats.

In order to monitor from the ground control station 1, the reaction of the pilot 11 to the threat environment suggested by the warnings 10, the training aircraft 3 carries an aircraft instrumentation subsystem (A.I.S.) pod 13, under a wing, which is designed to transmit to the ground control station 1 a coded message reflecting the actions of the pilot 11 on the aircraft and electronic counter-measure controls 12. This coded message may indicate for instance the orientation of the aircraft, its heading, its weapon status, etc. The A.I.S. pod 13 can be interrogated from the ground control station 1 via an up-link message 6. The aircraft status is transmitted in return via a down-link message 7 to the ground control station 1. This closed loop system allows the ground control station personnel to accurately evaluate the performance of the pilot subjected to a hostile environment.

Figure 2:
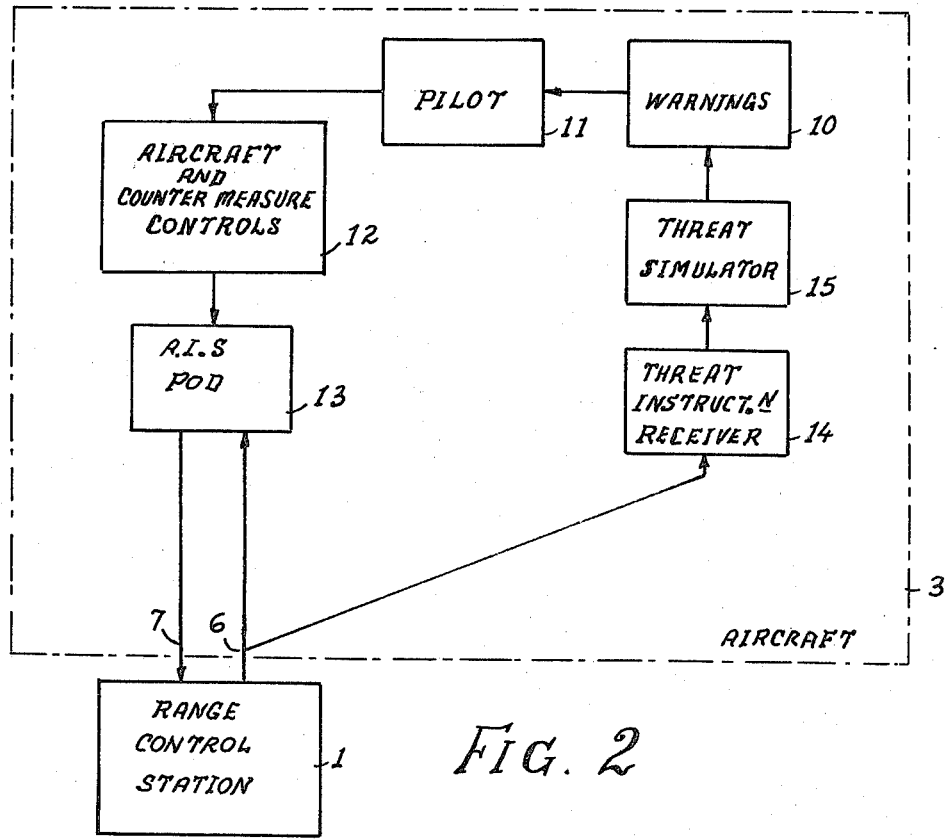
FIG. 2 is a block diagram illustrating the operation of an air combat maneuvering range improved by the present invention.

FIG. 2 illustrates the operation of an air combat maneuvering range improved by the application of the present invention.

Note that the threat mimicking station 2 has been eliminated and that the aircraft threat signal receiver 8 and processor 9 have been replaced by a threat instruction receiver 14 and a threat simulator 15.

The up-link message 6 is detected by both the A.I.S. pod 13 and the threat instruction receiver 14. The up-link message 6 comprises in addition to the A.I.S. pod interrogation, a threat simulation instruction which is ignored by the A.I.S. pod but recognized by the threat instruction receiver 14. The instruction is fed to the simulator which decodes it and generates warning control signals to activate the cockpit warnings. These warnings reflect a threat environment as programmed by the ground control station. The pilot 11 thus finds himself exposed to a simulated hostile environment just as he would be in the present air combat maneuvering range. As explained before, his reaction to the threat warning may be monitored at the ground control station via the A.I.S. pod aircraft monitoring and communication sub-system 13.

For the sake of explanation, we shall assume that the particular type of aircraft used in our hypothetical air combat maneuvering range uses two types of threat warning devices. The first type of warning is an audio signal which is fed into the pilot intercom; the second is a cathode ray tube display called azimuth indicator and its control panel. Other types of threat warning indicator could be used within the scope of the invention.

For a more detailed description of the azimuth indicator, reference is made to the Azimuth indicator Model No. 31-01554-01 as defined in U.S. Air Force technical manual 12P3-2 ALR 46-22 which is incorporated as part of this specification by reference.

Figure 3:
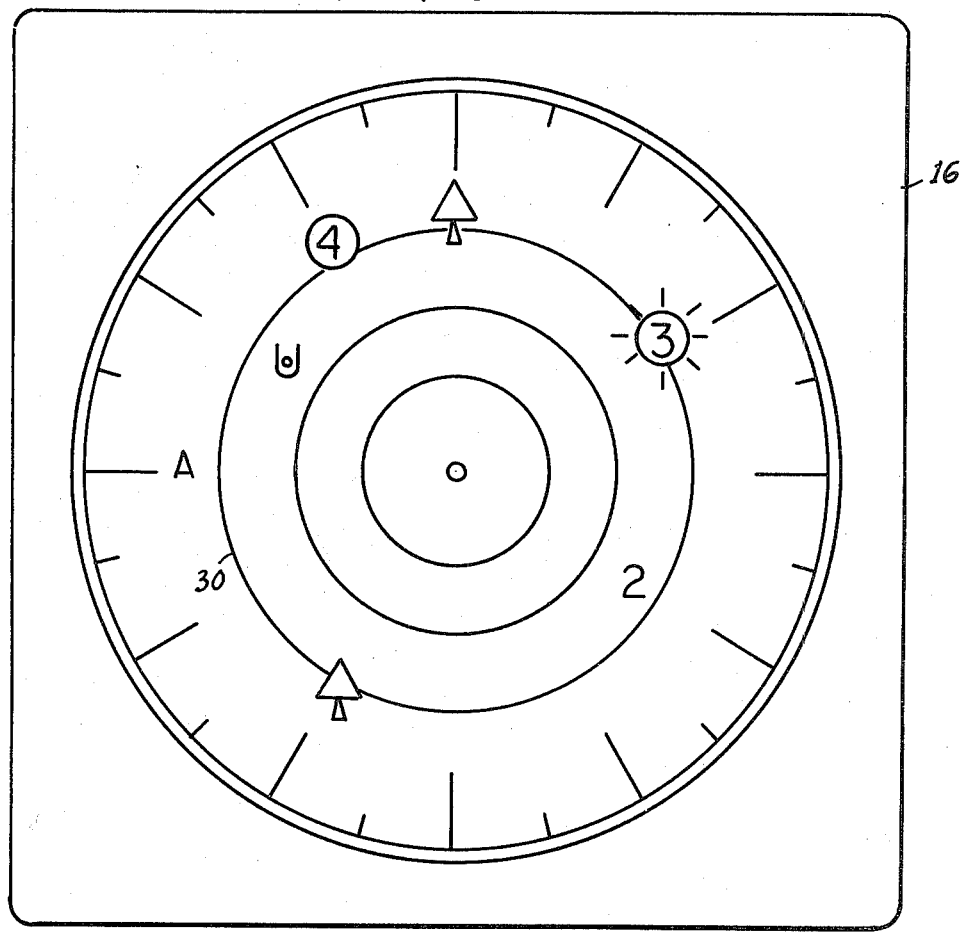
FIG. 3 illustrates the display of threats on a threat azimuth indicator.

FIG. 3 illustrates the azimuth indicator 16 displaying various types of threat.

A twelve o'clock is shown as symbol representing an airborne interceptor (AI) threat. At two o'clock as shown is a figure 3, inside a flashing circle representing a surface-to-air missile (SAM) in the process of being fired. At four o'clock is a figure 2 representing a SAM location. At seven o'clock a second AI threat symbol appears. At nine o'clock an "A" symbol indicates an automatic aircraft artillery (A.A.A.) threat. At ten o'clock a "U" symbol containing one dot signifies an unknown threat in band one.

Figure 4:
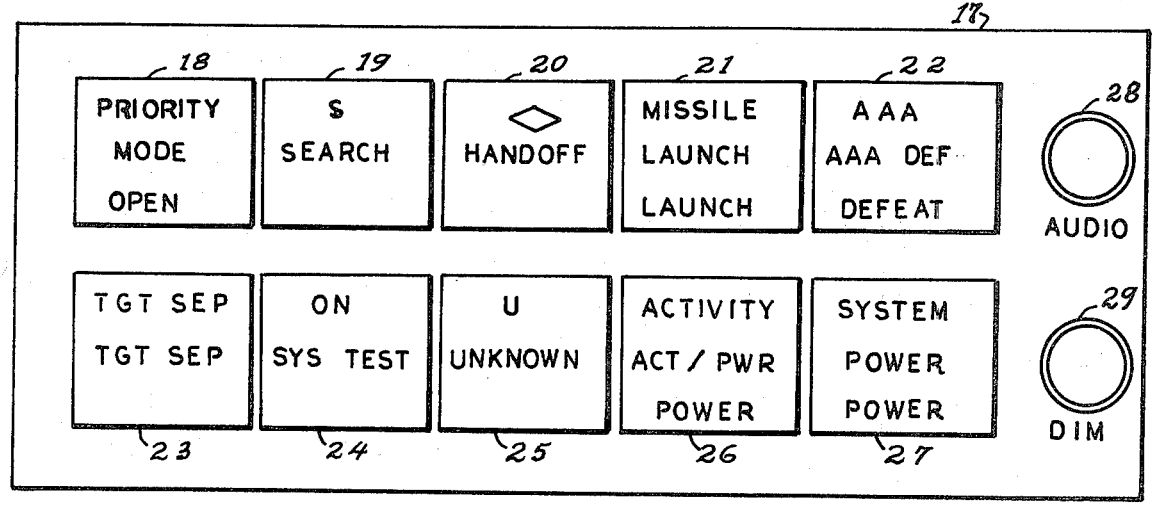
FIG. 4 shows a cockpit azimuth indicator control panel.

At eleven o'clock a figure 4 inside a steady circle indicates a SAM activity. These alpha-numerical displays allow the pilot to quickly evaluate the threats and make the appropriate maneuvers.

FIG. 4 illustrates the layout of the azimuth indicator control panel 17 operated by the pilot. This layout is typical of the type presently used in several military aircrafts and is described herein as part of the setting for the invention. Other control panel arrangements may be used in conjunction with the invention without departing from its scope.

The azimuth indicator control panel 17 has two rows of five illuminated switches 18 through 27, an audio volume control panel 28 and a switch light dimmer control knob 29. Each switch is marked with two or three legends. Only the legend in center of each switch is visible when the switch is not illuminated. In the operational system presently in use, two switches labelled LAUNCH 21 and ACT/PWR 26 control the operation of the threat signal receiver 8. The switch labelled POWER 27 controls the power supply to both the threat signal receiver 8 and the processor 9. The remaining seven switches are associated with the operation of the processor 9.

The MODE switch 18 allows for the display of the five highest priority threats in the PRIORITy mode, or for the display of all threats in the OPEN mode.

The SEARCH switch 19 allows for the display of search-type threat and airborne threats. If a missile activity of missile launch is decoded by the processor, the system will automatically return to the OPEN mode. If a missile activity or missile launch has been decoded before the SEARCH mode is activated, the system will remain in SEARCH mode.

The HANDOFF switch 20 allows for the display of a diamond symbol around the highest priority threat. This symbol will remain displayed for fifteen seconds. If the HANDOFF switch 20 is pressed again before the expiration of the fifteen seconds, the diamond symbol will switch to the next highest priority threat, and so on until all threats have been classified.

The AAA DEF switch 22 allows for blanking out all automatic aircraft artillery threats.

The TGT SEP switch 23 allows for the separation of threat symbols that are co-located. The symbols will return to their common location when the switch 6 is released.

The SYS TEST switch 24 allows for testing the operation of the azimuth indicator 16. When this switch is pressed, four dots (one of each quadrant 45°; 135°; 225°) appear on the third ring 30 of the azimuth indicator. The figure 1 will be displayed adjacent to each dot. The figures will then change to a figure 2 and finally to a figure 3. No other symbol will be displayed.

The UNKNOWN switch 25 will allow for the display of all signals that do not fit within any defined threat characteristic. Each signal will appear as a symbol "U" surrounding one, two or three dots. The dots identify the band of the signal.

Referring back to FIG. 2, we shall describe now the operation of a ACMR in which the threat signal receiver 8 and the processor 9 of each aircraft have been replaced by a threat instruction receiver 14 and threat simulator 15 respectively.

At the range ground control station 1 a combat scenario is devised which defines the aircraft flight, and the type and location of threats to which the aircraft 3 is to be exposed.

In this preferred embodiment of the invention, a maximum of eight threats may be caused to be displayed on the azimuth indicator 16 of the aircraft 3 simultaneously. There is no limit as to the number of threats that may displayed during the entire simulated combat.

For each phase of the scenario the location of each threat is correlated to the corresponding location of the aircraft 3 at that particular instant. From this, are derived the XY coordinates of the symbols to be displayed on the azimuth indicator 16.

During flight the threat symbol and XY coordinates are placed on the uplink message 6 which is received by the threat instruction receiver 14.

Threat envelopes can also be calculated and used at the ground control station to evaluate the performance of the pilot in conjunction with the craft information received via the down-link message 7.

The uplink message is received on the omni antenna of the threat signal receiver 8 now replaced by the threat instruction receiver 14.

In this embodiment, the last eleven words of the uplink message are dedicated to the threat simulation.

The processor first recognizes the bit synchronization word synchronization and AIS pod identification signal which appears at the beginning of the present up-link message. The process then skips to the nineteenth through the twenty-ninth words which constitute the threat information.

FIG. 5 illustrates the format of the eleven last sixteen bit words of the up-link message.

Figure 6:
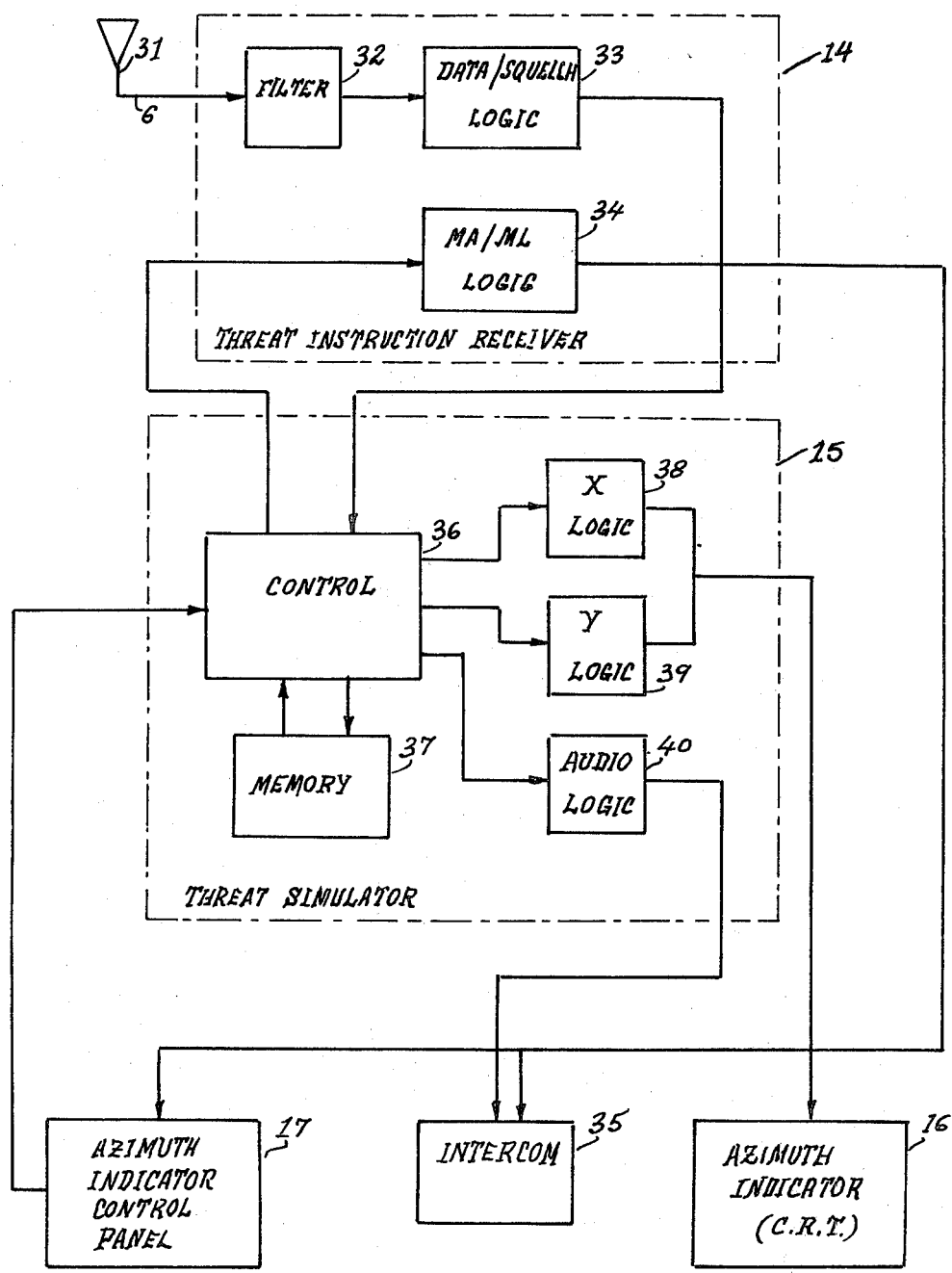
FIG. 6 is a block diagram showing the principal elements of the airborne system implementing the invention.

A general block diagram of the airborne threat simulation equipment is shown in FIG. 6.

The uplink message signal 6 received on the antenna 31 of the aircraft enters the threat instruction receiver 14 through a filter 32. The message is detected in the data/squelch logic circuit 33. The data and squelch signals are multiplexed and sent to the threat simulator 15. There, the signals are demodulated and applied to the control circuit 36 which, in cooperation with the memory circuit 37, processes the instruction data and drives the X logic circuit 38, the Y logic circuit 39 and the audio logic circuit 40. The control circuit 36 also generates a missile activity (MA) signal and missile launch (ML) signal and a MA/ML, enable signal which are multiplexed and sent to the threat instruction receiver MA/LA logic circuit 34. There, are generated the control signals necessary to drive the visual warning indicators of the indicator control panel 17.

The signals issued by the X logic and Y logic circuits 38,39 control the display of the azimuth indicator 16. The audio logic circuit generates audio tone warning signals which are fed to the aircraft intercom system 35.

The aircraft intercom system 35 also receives warning audio tones generated by the MA/ML logic circuit 34 of the receiver in connection with simulated missile threats.

The operation of the control circuit 36 is slaved to the commands entered by the pilot on the indicator control panel 17.

Figure 7:
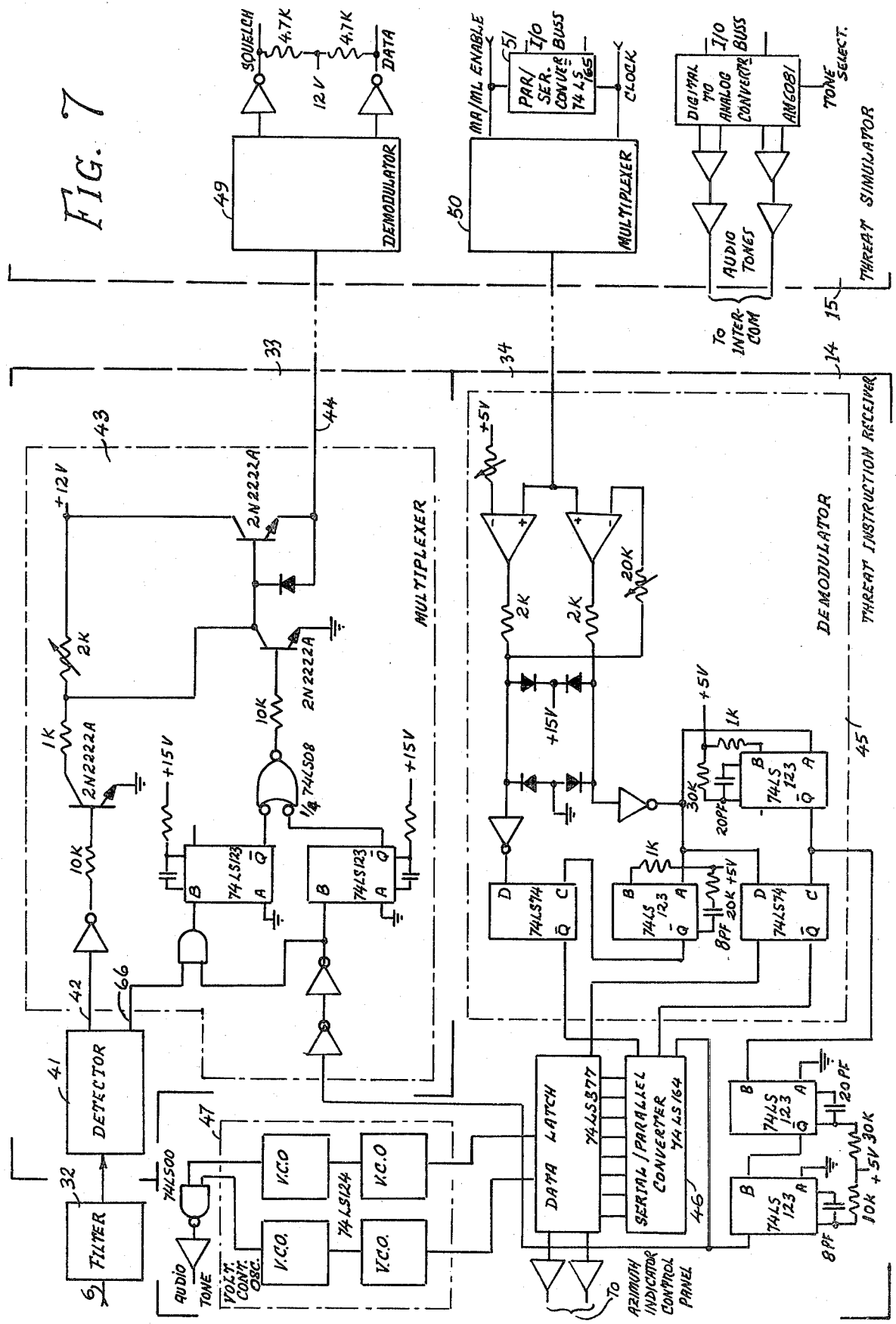
FIG. 7 is a schematic of the threat instruction receiver also showing the interface section of the threat simulator.
Figure 8:
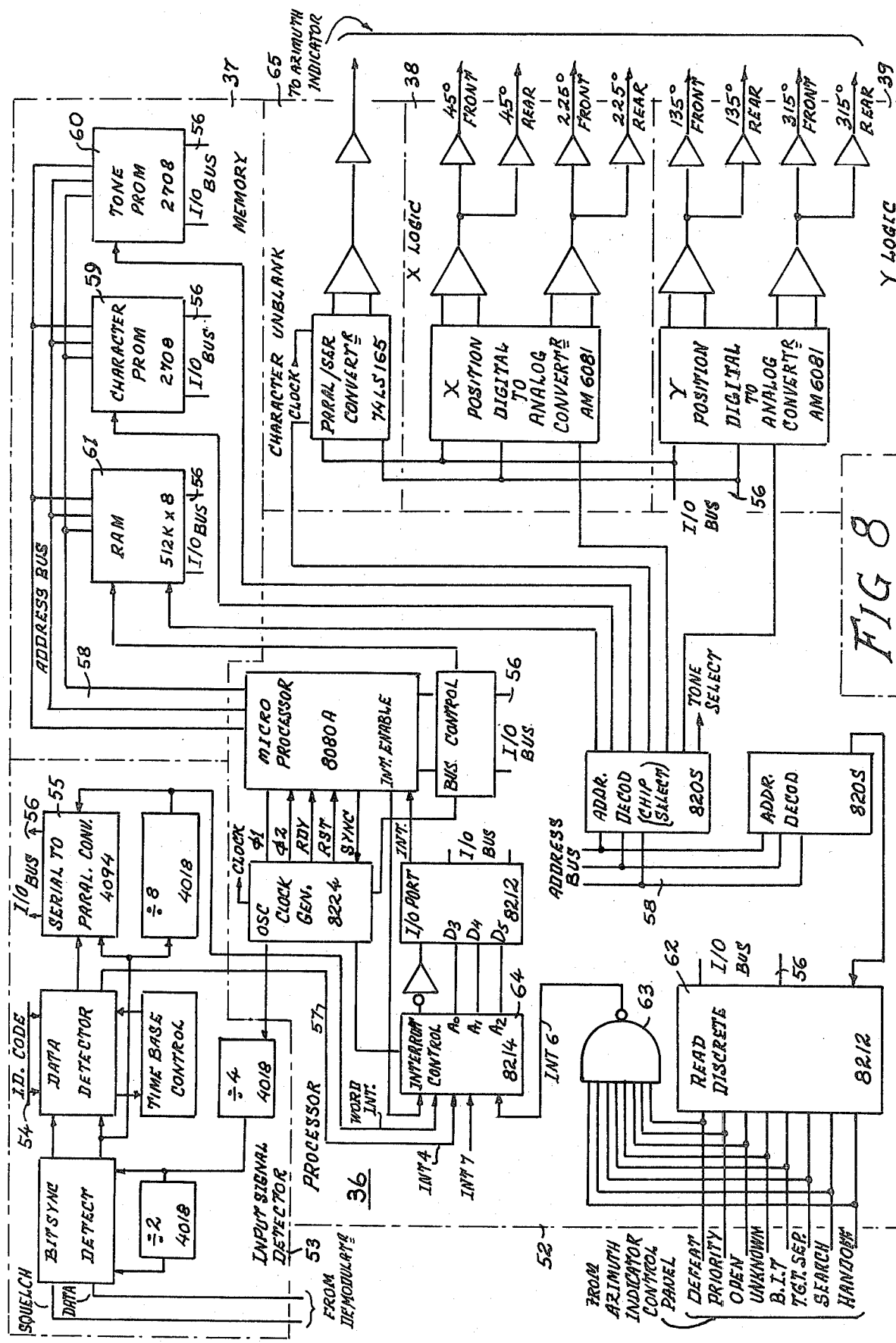
FIG. 8 is the schematic of the threat simulator.

A detailed description of the electronic circuitry is illustrated in FIGS. 7 and 8.

The threat instruction receiver 14 assembly is shown in FIG. 7.

The input filter 32 is a band-pass filter which allows only the frequency of the uplink instruction signal. The detector 41 comprises a diplexer and receiver circuit similar to the circuit used in the airborne instrumentation subsystem (A.I.S.) pod and a mark/space detector Model #145790 manufactured by Cubic corporation. It puts out a squelch signal 42, which goes down whenever the uplink message carrier is lost, and the data on a separate line 66. The multiplexer 43 combines the two signals on a single line 44 toward the threat simulator 15.

The MA/ML logic circuit 34 comprises a demodulator 45 which separates the missile activity, missile launch and MA/ML data received from the threat processor 15. The information is then fed into the serial to parallel converter circuit 46, where it is stored and used for controlling the MA/ML legends on the indicator control panel 17. The information is also fed through series of two voltage control oscillators 47 which generate the audio warning signals 48.

On FIG. 7 is also shown the interface circuit installed in the threat simulator 15. The combined squelch/data signals 44 are separated by a demodulator 49 similar to the demodulator 45 installed in the threat instruction receiver 14. The missile activity, missile launch signal and MA/ML enable signals are combined by a multiplexer 50 similar to the multiplexer 43 used in the threat instruction receiver 14. The missile activity, missile launch information is taken from the processor bus and serialized by the parallel to serial converter 51.

The bulk of the threat simulator assembly is illustrated in FIG. 8.

The control logic circuit 36 comprises a processor 52, and an instruction signal detector circuit 53.

The latter receives the output signals of the demodulator 49 and is formed by the same circuit which is used at the input of the aircraft airborne instrumentation sub-system A.I.S. pod assembly, detecting the uplink message. This detector circuit 53 comprises a bit and word synchronization logic followed by an identification card detector which unlocks the data signal only when the identification code 54 assigned to the system is recognized in the uplink message. It includes also a serial to parallel converter 55 which is connected to the processor input/output bus 56. The detector 53 issues a message interrupt 57 (Interrupt 4) to the processor 52 at the beginning of each threat instruction.

The processor 52 comprises a micro-processor unit model 8080A, a bus control unit Mode #8228, a clock generator unit Model #8224, an interrupt control unit Model #8214, two address decoder units Model #8205, and an input/output ports unit Model #8212, all manufactured by INTEL Corporation. The characteristics and operation of these various units is fully described in their manufacturer's catalogues and the operating instruction manuals related to these products. The operation of the processor in accordance with the flow chart illustrated in FIG. 9, can be easily implemented by people skilled in the electronic arts, and having access to said documentation.

The address bus 58 is connected to the memory circuit 37 which comprises two programmable-read-only memories (PROM's) 59,60 and a random-access-memory (RAM) 61.

The first PROM 59 contains all the necessary coded characters to be displayed as threat symbols on the azimuth indicator 16. The second PROM 60 contains all the information necessary to generate the audio warning signals suggestive of the type of threats. The RAM 61 is used to store the threat simulation instruction words.

The processor input/outpt Bus 56 is connected to the output of the serial-to-parallel converter 55 and to the read-discrete circuit 62. The read-discrete circuit 62 receives the signals representing the status of the indicator control panel switches 18 through 25. The gate 63 generates a control interrupt (Interrupt 6) whenever one of the indicator panel switches is activated.

The input/output bus 56 is also connected to the X and Y control logic circuits 38, 39. Each one of these circuits contain a digital to analog converter which generates driving signals for the four front and rear plates of the azimuth indicator 16. The input signals to the X and Y control logic circuit includes the XY coordinates, and quadrant location extracted from the RAM 61 and the symbols coding extracted from the first PROM 59.

The azimuth indicator beam is normally blanked-out and allowed only during its symbol writing process by the unblanking control circuit 65.

The wiring configuration shown in FIGS. 7 and 8 is only demonstrational and may be changed in order to adapt this embodiment of the invention to other types of threat instructions, threat symbols or warning devices, in accordance with the components manufacturers specifications and recommendations.

Other modifications may be made to this preferred embodiment of the invention without departing from the scope of the appended claims.

I claim:

1. In an aircraft used for range training of a pilot in electronic warfare, an apparatus for simulating the detection of impeding threats to the aircraft which comprises:
   means for receiving a radio control instruction defining at least one simulated impeding threat;
   means, responsive to the control instruction for generating at least one warning control signal; and,
   means responsive to said control signal for warning the pilot of said simulated threat.

2. The apparatus claimed in 1 wherein said means for warning comprise a cathode ray tube display.

3. The apparatus claimed in 1 wherein said means for warning comprise means for generating an audio tone.

4. The apparatus claimed in 1 which further comprises an enclosure housing said means for receiving and said means for generating; said enclosure having dimensions and interface characteristics which are similar to the dimensions and the interface characteristics of an enclosure normally used to house the aircraft means for detecting enemy guideance radar signals and means for interpreting said enemy guidance signals.

5. The apparatus claimed in 4 which further comprises an instrumentation sub-system having means for transmitting the aircraft performance data to a control station; and
   means for receiving a radio control instruction transmitted from a control station as part of the up-link message to the instrumentation sub-system.

6. The apparatus claimed in 5 wherein said means for receiving comprises means for detecting, within the radio control instruction, the identification code of at least one type of threat and the coordinates at the spot at which said threat is to be displayed on a cathode ray tube.

7. The apparatus claimed in claim 6 wherein said means for warning comprise:
   a cathode ray tube;
   means for displaying a plurality of threats by ways of characters and of their positions on the face of the cathode ray tube in response to said identification code and said coordinates.

8. The apparatus claimed in 7 wherein said means for receiving comprise a bandpass filter tuned to the up-link message carrier frequency;
   means for generating a squelch signal when said carrier frequency is lost; and
   means for multiplexing said squelch signal and said message data signals and for transmitting the multiplexed signals to said means for generating.

9. The apparatus claimed in 8 wherein said means for generating comprise:
   a micro processor;
   a random access memory for storing said instruction data;
   a read-only memory for generating said character display data;
   a plurality of digital to to analog converters for converting said instruction data and said character display data into analog signal applicable to said cathode ray tube.

10. The apparatus claimed in claim 9 wherein said means for generating comprises manually operated command means for modifying the display of the threats defined in said instruction.

* * * * *